United States Patent
Scholl

(10) Patent No.: US 12,365,224 B2
(45) Date of Patent: Jul. 22, 2025

(54) SEALING ARRANGEMENT AND METHOD FOR PRODUCING SAME

(71) Applicant: Cooper-Standard Automotive (Deutschland) GmbH, Schelklingen (DE)

(72) Inventor: Erik Scholl, Weiskirchen (DE)

(73) Assignee: COOPER-STANDARD AUTOMOTIVE (DEUTSCHLAND) GMBH, Schelklingen (DE)

( * ) Notice: Subject to any disclaimer, the term of this patent is extended or adjusted under 35 U.S.C. 154(b) by 0 days.

(21) Appl. No.: 18/627,423

(22) Filed: Apr. 4, 2024

(65) Prior Publication Data

US 2024/0246402 A1    Jul. 25, 2024

Related U.S. Application Data

(63) Continuation of application No. PCT/EP2022/077556, filed on Oct. 4, 2022.

(30) Foreign Application Priority Data

Oct. 6, 2021   (EP) .................... 21201332

(51) Int. Cl.
*B60J 10/21*   (2016.01)
*B60J 10/32*   (2016.01)
(Continued)

(52) U.S. Cl.
CPC .............. *B60J 10/21* (2016.02); *B60J 10/32* (2016.02); *B60J 10/84* (2016.02); *B60J 10/15* (2016.02)

(58) Field of Classification Search
CPC ... B60J 10/21; B60J 10/16; B60J 10/22; B10J 10/23
See application file for complete search history.

(56) References Cited

U.S. PATENT DOCUMENTS 4,736,981 A    4/1988   Barton
5,553,423 A *  9/1996   Kato ................. B60J 10/25
                                                   52/716.5
(Continued)

FOREIGN PATENT DOCUMENTS

DE    102005028738 B3    3/2007
EP       0799735 A1     10/1997
(Continued)

OTHER PUBLICATIONS

JP2002046476 English Translation from WIPO (Year: 2002).*
(Continued)

*Primary Examiner* — Daniel J Troy
*Assistant Examiner* — Susan M. Heschel
(74) *Attorney, Agent, or Firm* — Reising Ethington PC

(57) ABSTRACT

A sealing arrangement for sealing a closure member against a frame portion. The sealing arrangement comprises a first sealing profile strand, a second sealing profile strand, and a corner sealing portion. The first sealing profile strand is arranged along a first direction and has a first cross-section. The second sealing profile strand is arranged along a second direction transverse to the first direction, and has a second cross-section. The corner sealing portion joins the first sealing profile strand and the second sealing profile strand in a region of respective ends thereof. The corner sealing portion comprises a third sealing profile strand having a third cross section and a first end and a second end. The first end of the third sealing profile strand is joined to the first sealing profile strand. The second end of the third sealing profile strand is joined to the second sealing profile strand.

19 Claims, 4 Drawing Sheets

(51) Int. Cl.
    *B60J 10/84*         (2016.01)
    *B60J 10/15*         (2016.01)

(56) References Cited

U.S. PATENT DOCUMENTS

| | | | |
|---|---|---|---|
| 6,395,355 B1 * | 5/2002 | Nakajima | B60J 10/80 |
| | | | 428/34.1 |
| 2003/0020301 A1 * | 1/2003 | Teishi | B60J 10/21 |
| | | | 296/146.9 |
| 2009/0021044 A1 | 1/2009 | Maab et al. | |
| 2009/0064592 A1 * | 3/2009 | Takase | B60J 10/50 |
| | | | 49/374 |
| 2015/0101254 A1 | 4/2015 | Tooker et al. | |

FOREIGN PATENT DOCUMENTS

| | | | | |
|---|---|---|---|---|
| GB | 2311799 A | * | 10/1997 | B60J 10/21 |
| JP | 2002046476 A | * | 2/2002 | |

OTHER PUBLICATIONS

International Search Report and Written Opinion issued for PCT/EP2022/077556 on Nov. 30, 2022.
European Search Report issued for EP 21 201 332.0 on Mar. 11, 2022.
International Preliminary Report on Patentability issued for PCT/EP2022/077556 on Apr. 18, 2024.

* cited by examiner

SEALING ARRANGEMENT AND METHOD FOR PRODUCING SAME

CROSS-REFERENCE TO RELATED APPLICATIONS

The present application is a continuation application of International patent application PCT/EP2022/077556, filed Oct. 4, 2022, which claims the priority of European patent application EP21201332.0, filed Oct. 6, 2021. The entire disclosures of the above applications are incorporated herein by reference.

FIELD

The present disclosure relates to a sealing arrangement for sealing a closure member against a frame portion, comprising a first sealing profile strand arranged along a first direction and having a first cross section, a second sealing profile strand arranged along a second direction transverse to the first direction and having a second cross section, and a corner sealing portion joining the first sealing profile strand and the second sealing profile strand in a region of respective ends thereof.

Further, the present disclosure relates to a method for producing a sealing arrangement.

BACKGROUND

Vehicles, particularly automobiles, include a number of sealing arrangements for sealing, at interior access areas like doors, flaps, lids, etc., an interior of the vehicle against the outside.

Particularly in vehicles having four doors, a so-called B-pillar is typically provided as a part of the vehicle body, which B-pillar is arranged between the respective front and rear doors.

In order to provide this area with an aesthetic appearance, it is known to provide so-called appliques between the windows of the front and the rear doors, in order to add styling or cover unsightly portions of the vehicle.

The windows of the front and rear doors are sealed against the outside by respective sealing arrangements. Further, in many cases, another sealing arrangement is provided between the front door and the rear door. This assists in sealing off the interior of the vehicle against the outside and also contributes to reducing noise in the inside of the vehicle (e.g. passenger compartment).

In some cases, the other sealing arrangement that is provided between the front door and the rear door in the upper area of the doors (in the window area) is made part of the applique arrangement. Particularly, a margin seal is extruded separately and then adhered (e.g. by thermoplastic welding, glueing etc.) to an edge of the applique, so as to extend between the doors of the vehicle.

In some cases, the margin seal extends between an applique attached to the rear door and an applique attached to the front door of the vehicle.

SUMMARY

It is an object of the present disclosure to provide an improved sealing arrangement and an improved method for producing a sealing arrangement.

The above object may be achieved with a sealing arrangement for sealing a closure member against a frame portion, comprising a first sealing profile strand arranged along a first direction and having a first cross-section, a second sealing profile strand arranged along a second direction transverse to the first direction and having a second cross-section, a corner sealing portion joining the first sealing profile strand and the second sealing profile strand in a region of respective ends thereof, wherein the corner sealing portion comprises a third sealing profile strand having a third cross section and a first end and a second end, wherein the first end of the third sealing profile strand is joined to the first sealing profile strand, and wherein the second end of the third sealing profile strand is joined to the second sealing profile strand.

Further, the above object may be achieved by a method for producing a sealing arrangement of the present disclosure, comprising the steps of: extruding the first sealing profile strand, the second sealing profile strand, and the third sealing profile strand; placing the first sealing profile strand, the second sealing profile strand, and the third sealing profile strand in a mold; and joining the first sealing profile strand, the second sealing profile strand, and the third sealing profile strand by molded material so as to form the sealing arrangement with the corner sealing portion.

The closure member might be a window of a vehicle door, for example a front door.

The first sealing profile strand may be a header sealing profile strand extending essentially along a horizontal direction. The second sealing profile strand may be a B-pillar sealing profile strand extending essentially along a vertical direction.

The third sealing profile strand may be a corner sealing profile strand which is preferably produced separately from the first and the second sealing profile strand. Therefore, high design flexibility is provided. Particularly, it is possible to adapt the elastic properties if the individual strands to the function to be achieved. For example, the corner sealing profile strand might be provided with an improved permanent set, so as to have a lower portion of plastic deformation (in relation to its elastic deformation), in comparison to the portion of plastic deformation of one of the other strands. High performance material might be used for the corner sealing profile strand.

Further, in some embodiments, joins between molded material and extruded material are visible, thus facilitating inspection of the produced sealing arrangement.

The third sealing profile strand is preferably arranged so as to bridge a virtual connection point between the first and second sealing profile strands. In other words, the third sealing profile strand preferably extends in a third direction which is different from the first direction and from the second direction. The first, the second, and the third sealing profile strand essentially form the shape of a triangle in the area of the corner sealing portion. While the first and the second sealing profile strand preferably extend essentially along respective straight lines, the third sealing profile strand is preferably curved.

In other words, the third sealing profile strand is placed into a mold for producing the sealing arrangement, wherein the third sealing profile strand is inserted into the mold while being bent. Preferably, end portions of the third sealing profile strand extend essentially along the first direction and along the second direction, respectively, while an intermediate portion of the third sealing profile strand extends along an arc between the first and second sealing profile strands.

Preferably, at least one of the first sealing profile strand, the second sealing profile strand, and the third sealing profile strand is an extruded strand.

The first sealing profile strand and the second sealing profile strand preferably have different cross sections and are produced by means of different extrusion tools. The third sealing profile strand has a cross section which is different from the cross sections of the first and second sealing profile strands, and is produced in another extrusion tool which is different from the tools used for the first and second sealing profile strands.

Preferably, at least some lips of the different sealing profile strands are in each case provided with a coating in order to reduce friction between the sealing profile strands and the closure member. The coating may be a flock coating, for example.

Further, it is preferred if the corner sealing portion comprises a molded portion which is molded to each of the first, second and third sealing profile strands.

The molded portion may include an essentially flat portion which extends along a plane that is defined by the first and the second direction.

Further, the molded portion may form an apex of the corner sealing portion. In other embodiments, the apex of the corner sealing portion is formed by the first and second sealing profile strands. In this case, the molded portion typically extends mainly between inner edges of the first, second and third sealing profile strands. However, the molded material of the molded portion may in any case be used to produce joins, for example between an end portion of the first sealing profile strand and an end portion of the second sealing profile strand. These end portions may be cut at right angles or may be mitre-cut, wherein molded material is provided between the cutting faces of the respective strands.

In addition, the molded material may be used to form so-called zero-gap-joins. Namely, the molded material may connect sealing profile strands which are arranged in the mold in a contiguous and directly adjacent manner, wherein the molded material is not provided directly between the end faces of the respective strands. Rather, the molded material is provided at the underside of lips of the respective strands, so as to hold the strands together and to avoid the production of a visible gap filled with molded material.

In a preferred embodiment, each of the first and second sealing profile strands comprises a first inside lip and a second inside lip for engaging the closure member.

The provision of two inside lips improves the sealing quality, both with respect to tightness and with respect to noise absorption.

The term "inside lip" refers to the fact that the lip is provided on the inside of the closure member and contacts the closure member on the inside surface thereof.

Further, it is preferred if the third sealing profile strand comprises a single inside lip.

The single inside lip has preferably a cross sectional shape which is identical to the respective first inside lips of the first and second sealing profile strands.

Therefore, it is preferred if the first end of the third sealing profile strand is joined to the first sealing profile strand in such a manner that the first inside lip of the first sealing profile strand is contiguous to the single lip at the first end of the third sealing profile strand.

As an alternative or in addition, the second end of the third sealing profile strand may be joined to the second sealing profile strand in such a manner that the first inside lip of the second sealing profile strand is contiguous to the single lip at the second end of the third sealing profile strand.

Further, it is preferred if each of the first and second sealing profile strands comprises an end lip against which may abut an end face of the closure member. This feature also contributes to improving tightness and noise absorption.

Further, it is preferred if each of the first and second sealing profile strands comprises an outside lip for engaging the closure member.

Here, the closure member can be inserted into a channel of the respective sealing profile strands, formed between at least one inside lip and at least one outside lip.

The outside lip of the second sealing profile strand may be considerably larger than the outside lip of the first sealing profile strand.

In addition, it is preferred if an inner split line which is formed by a joint between the third sealing profile strand and the molded portion of the corner sealing portion, is visible as running essentially parallel to the tip edge of an inside lip of the corner sealing portion when viewed in the direction perpendicular to the molded portion and/or perpendicular to a plane of the closure member.

The visibility of the joint facilitates inspection of the sealing arrangement, particularly with respect to the question whether the joint has been produced correctly or not.

It is understood that the joint is preferably visible if the inside lip of the corner sealing portion is not deflected by the closure member. It is particularly preferred, if the joint between the third sealing profile strand and the molded portion is visible also in case that the inside lip of the corner sealing portion is deflected by the closure element.

The viewing direction is in any case perpendicular to the molded portion and/or perpendicular to a plane of the closure member.

Further, it is preferred overall if an outer split line which is formed by a joint between a molded portion of the corner sealing portion at at least one of the first sealing profile strand and the second sealing profile strand, is visible as running essentially parallel to an outside edge of the molded portion, when viewed in a direction perpendicular to the molded portion and/or perpendicular to a plane of the closure member.

Again, this feature facilitates inspection of the produced sealing direction.

Another preferred embodiment provides that the first sealing profile strand comprises a first attachment portion with a reinforcing insert which defines a U-shaped frame channel.

The frame channel is suitable for taking up a part of the frame portion. The reinforcing insert, which may be made of a metal material, allows attachment of the first sealing profile strand rigidly to the frame portion.

Further, the material of at least one of the first sealing profile strand, the second sealing profile strand and the third sealing profile strand is EPDM and/or TPE.

Similarly, material on the molded portion of the corner sealing portion is EPDM and/or TPE.

It is preferred that the materials of the strands and of the molded portion be identical. However, they may be different, if necessary.

In the method for producing a sealing arrangement of the present disclosure, it is preferred that inner portions of both the first sealing profile strand and the second sealing profile strand are cut off and discarded after the extruding step and before the joining step, so that first and second ends of a single lip of the third sealing profile strand can be arranged in a mold to be contiguous to a first inside lip of the first sealing profile strand and a first inside lip of the second sealing profile strand, respectively.

In other words, the single lip of the third sealing profile strand connects the first inside lips of the first and second sealing profile strands.

The cutting step is made such that the respective sealing profile strands are partially cut, preferably in the area of the respective first inside lips, while the first and second sealing profile strands remain intact in the remaining cross sectional area and may extend to and meet at the apex of the corner.

Particularly, split lines where the first and second sealing profile strands are split, extend preferably between the first and second inside lips thereof.

The terms upper, lower, front, rear, inside, outside, etc. relate to the description of specific embodiments, but shall not limit the interpretation of the general teaching of the present disclosure.

It will be understood that the features of the invention mentioned above and those yet to be explained below can be used not only in the respective combination indicated, but also in other combinations or in isolation, without leaving the scope of the present invention.

DRAWINGS

Exemplary embodiments of the present disclosure are explained in more detail in the following description and are represented in the drawings, in which.

EMBODIMENTS

In the following, embodiments of the present disclosure are described in detail.

Figure 1:
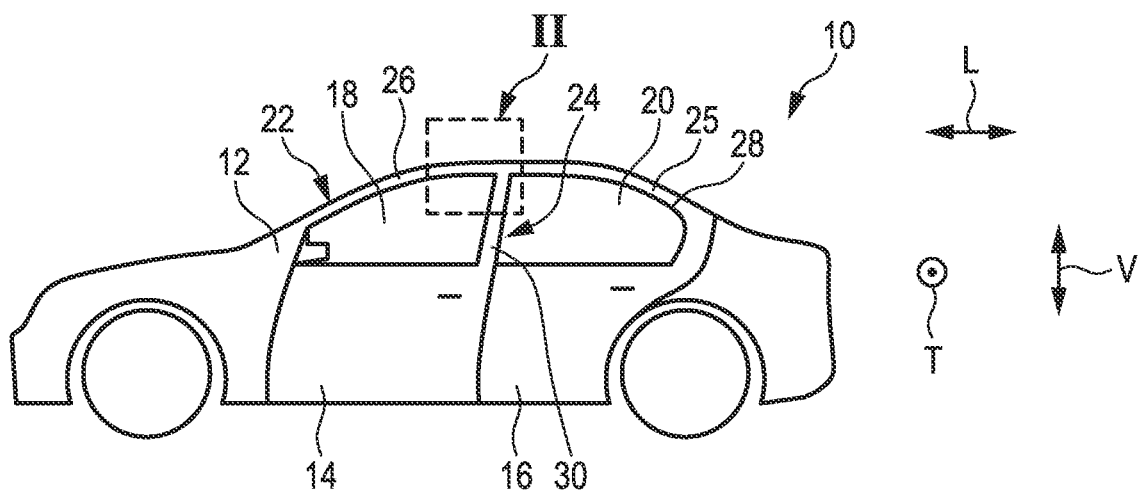
FIG. 1 is a schematic side view of a vehicle including a sealing arrangement for sealing a window against a frame portion.

An automobile like a passenger car vehicle is schematically shown in FIG. 1 and generally denoted by 10. The vehicle 10 has a body 12, to which are hingedly connected a front door 14 and a rear door 16.

The front door 14 has a front door window 18. The rear door 16 has a rear door window 20.

The front door 14 and the rear door 16 are each preferably hingedly mounted at their respective forward edges. The body 12 includes an A-pillar region 22 in the area of the forward edge of the front door 14, and a B-pillar region 24 which is arranged essentially between the front door 14 and the rear door 16. Preferably, the rear door 16 is hingedly mounted to the B-pillar region 24, and is adjacent to a C-pillar region 25.

The front door 14 has a front door window sealing arrangement 26 for the front door window 18. The rear door 16 has a rear door window sealing arrangement 28 for the rear door window 20.

Figure 3:
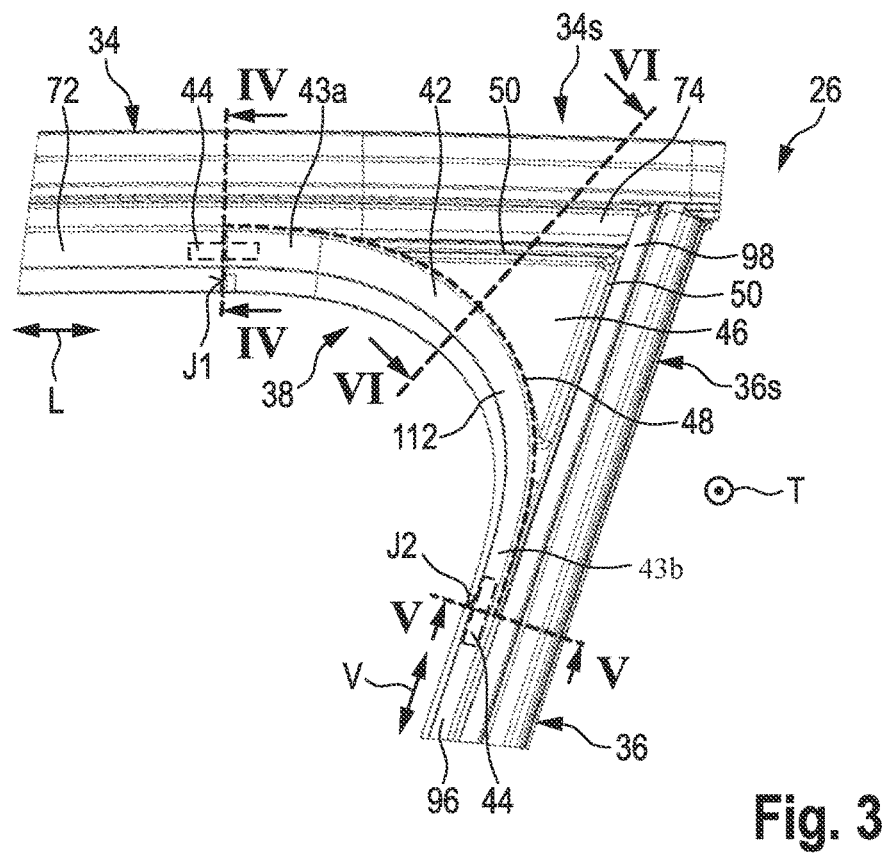
FIG. 3 shows the corner sealing portion of the sealing arrangement of FIGS. 1 and 2.

The body 12 defines a first direction L, which is preferably a longitudinal direction of the vehicle 10. Further, the body 12 defines a second direction V which is preferably a vertical direction of the vehicle 10. In addition, the body 12 defines a third direction T, which is preferably a transverse direction of the vehicle. The three directions are also used to describe a sealing arrangement. The directions are shown in FIG. 3, for example.

The vehicle 10 includes an applique arrangement 30 which is provided in the B-pillar region 24 between the front door window 18 and the rear door window 20.

Figure 2:
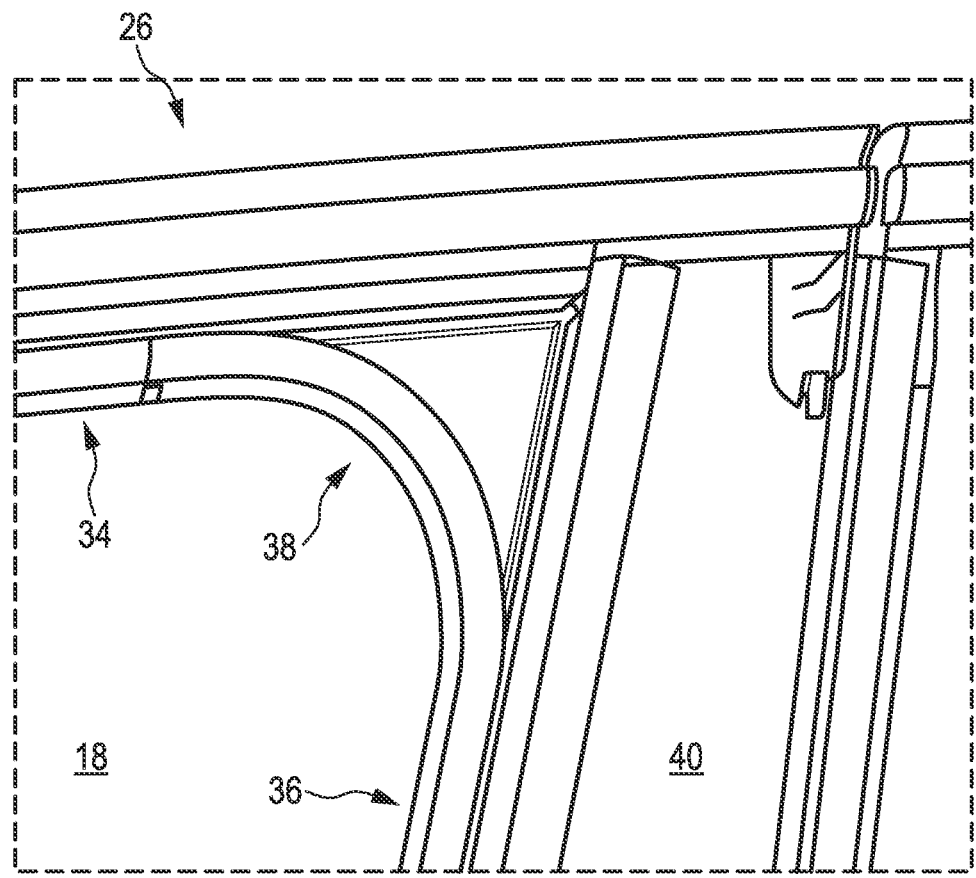
FIG. 2 shows a detail II of FIG. 1.

FIG. 2 shows a detail II of FIG. 1. Particularly, FIG. 2 shows a corner region of the front door sealing arrangement 26.

The sealing arrangement 26 includes a header sealing profile strand 34 and a B-pillar sealing profile strand 36.

The header sealing profile strand 34 extends along an upper edge of the window frame of the front door window 18. The B-pillar sealing profile strand 36 extends essentially along the B-pillar region 24.

The header sealing profile strand 34 and the B-pillar sealing profile strand 36 are connected by means of a corner sealing portion 38 that will be explained in detail with respect to FIGS. 3 to 6. With respect to FIG. 2, it is noted that an applique space 40 is provided for an applique arrangement not shown in FIG. 2.

FIG. 3 shows the corner sealing portion 38 which is connected to the sealing profile strands 34, 36.

The header sealing profile strand 34 extends essentially along the first direction L which follows the upper edge of the front door window. The B-pillar sealing profile strand 36 essentially extends along the second direction V. The first and second directions L, V are arranged transverse to each other, but not necessarily at a right angle. In FIG. 3, the third direction P which is essentially perpendicular both to the first and second directions L, V is shown at T.

The sealing arrangement 26 includes a corner sealing profile strand 42 which extends between the sealing profile strands 34, 36.

The corner sealing profile strand 42 has a first end 43*a* and a second 43*b*.

The header sealing profile strand 34 is cut out in the region of the corner sealing portion 38. The first end 43*a* of the corner sealing profile strand 42 is joined at a first joint to a part of the header sealing profile strand 34. The first joint is shown at J1.

The first joint J1 is a zero-gap joint. The first joint J1 is held together by a joint support 44 which is preferably provided at the back side of respective lip portions of the sealing profile strands 34, 42 and is preferably made of molded material.

On the other hand, the second end 43*b* of the corner sealing profile strand 42 is joined to a part of the B-pillar sealing profile strand 36 at a second joint J2. The second joint J2 is formed in essentially the identical manner as how the first joint J1 is formed.

Therefore, the second joint J2 is also supported by a joint support 44, which is preferably made of molded material.

The header sealing profile strand 34, the B-pillar sealing profile strand 36 and the corner sealing profile strand 42 are each produced by respective extrusion tools, and are thus formed as extruded strands.

On the other hand, the corner sealing portion 38 also includes a molded portion 46. The molded portion 46 is formed by molded material.

Particularly, the sealing arrangement 26 is produced by placing the different extruded sealing profile strands 34, 36, 42 into a mold, and by injection molding sealing material into the mold so as to join the sealing profile strands 34, 36, 42 and to form the molded portion 46 which is arranged essentially within a triangle formed by the sealing profile strands 34, 36, 42.

When viewed in a direction perpendicular to the molded portion (which is essentially identical to a direction perpendicular to a plane of the window 18), an inner split line 48 and an outer split line 50 are visible from the outside.

The inner split line 48 is a split line between the molded portion 46 and the corner sealing profile strand 42. The outer split line 50 is a split line between the molded portion 46 and each of the header sealing profile strand 34 and the B-pillar sealing profile strand 36.

Figure 4:
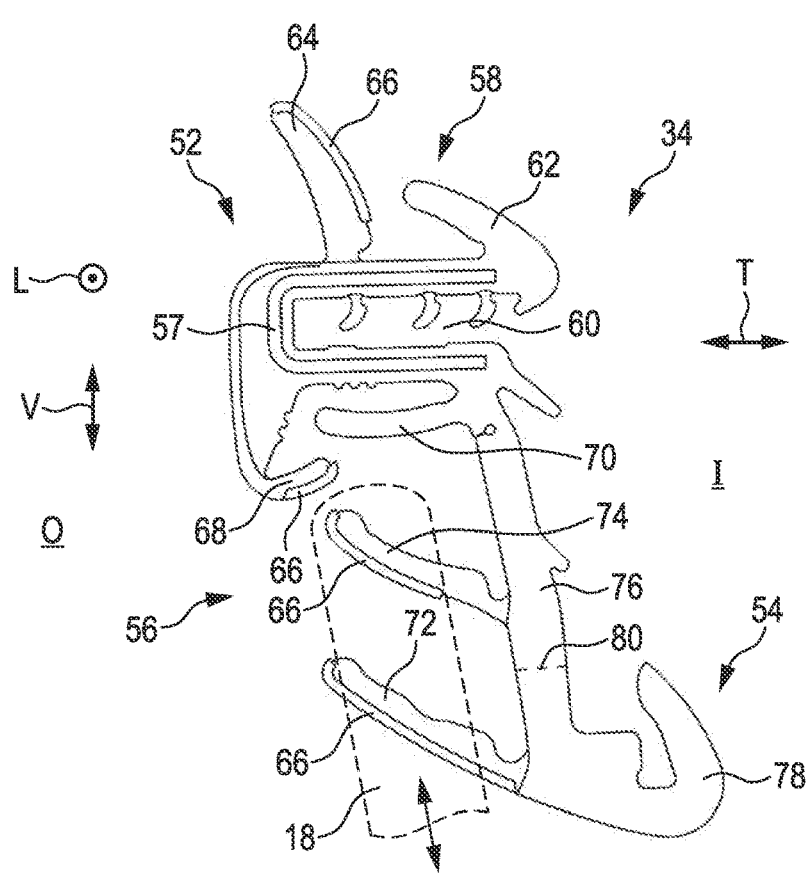
FIG. 4 is a cross section IV-IV in FIG. 3.
Figure 5:
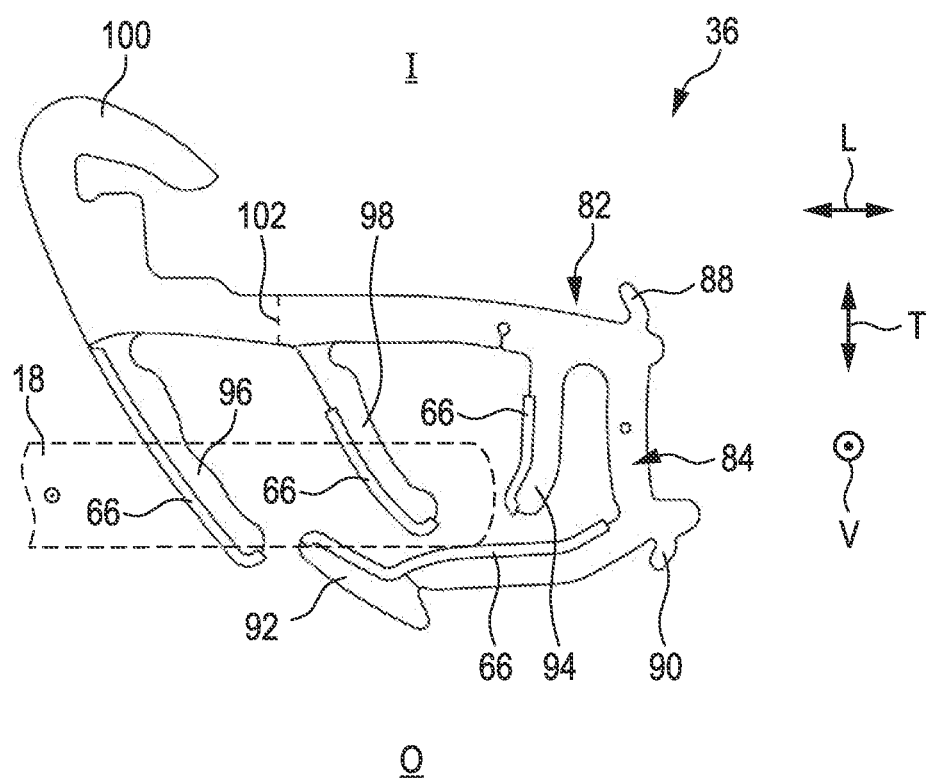
FIG. 5 is a cross section V-V in FIG. 3.
Figure 6:
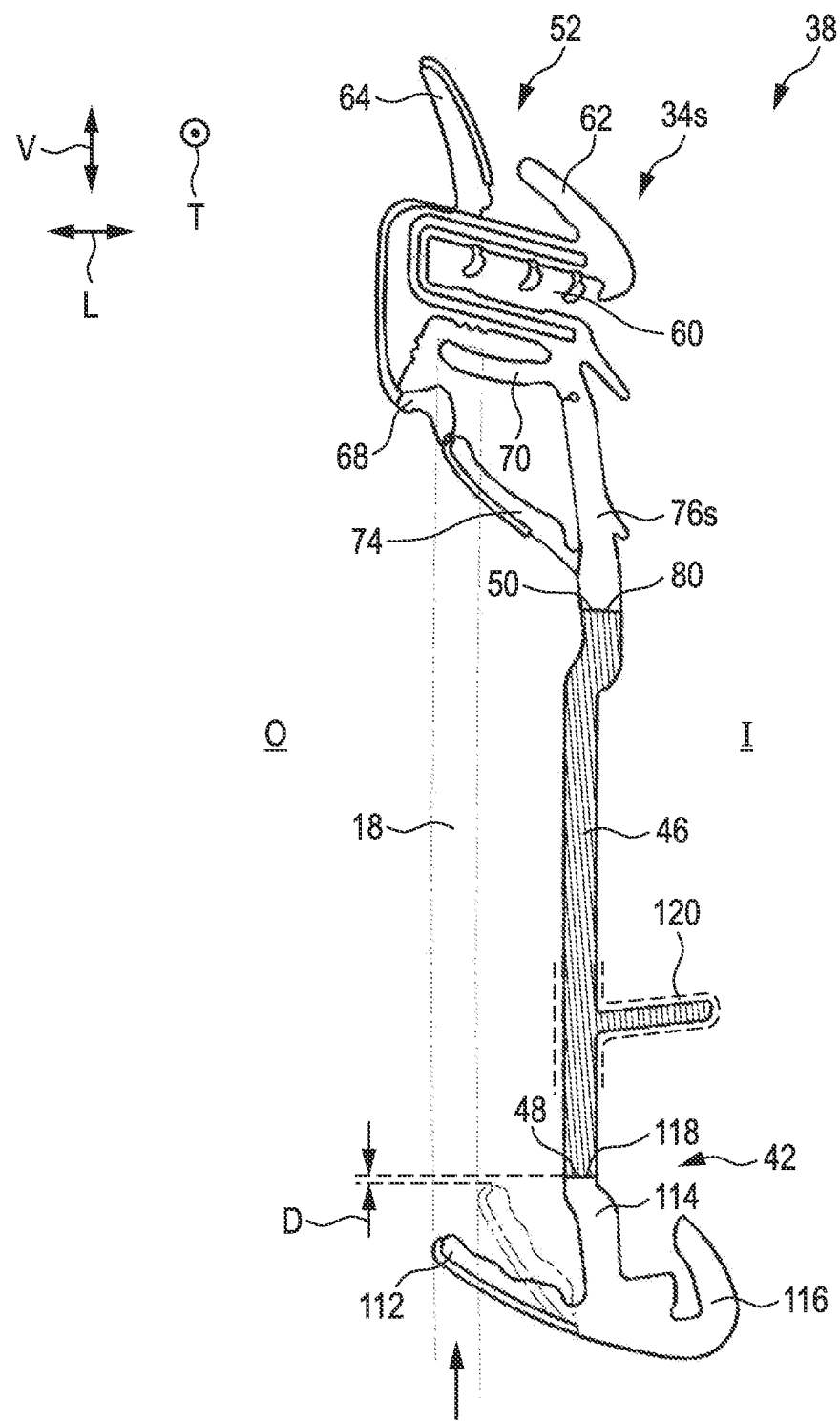
FIG. 6 is a cross section VI-VI in FIG. 3.

FIG. 4 is a cross sectional view of the header sealing profile strand 34, along a line IV-IV in FIG. 3. FIG. 5 is a cross sectional view of the B-pillar sealing profile strand 36, along a line V-V in FIG. 3. FIG. 6 is a cross sectional view of the corner sealing portion 38, along a line VI-VI in FIG. 3.

In FIG. 4, an outside of the sealing arrangement is shown at O, and an inside at I.

The header sealing profile strand 34 includes a first attachment portion 52 which is provided in order to attach the header sealing profile strand 34 to an upper frame portion of the front door 14. Further, the header sealing profile strand 34 includes a second attachment portion 54 which is provided at another end of the cross section of the header sealing profile strand 34, i.e. at another end in the second direction V. The second attachment portion 34 also serves to attach the header sealing profile strand 34 to the front door frame. The main attachment portion, however, is the first attachment portion 52.

Further, the header sealing profile strand 34 includes a window sealing portion 56, which serves to receive an upper edge of the window 18 and serves to seal the inside from the outside and to reduce noise in the inside I.

The first attachment portion 52 includes a reinforcing insert 57, which may be made of a more rigid material than the material of the header sealing profile strand 34.

The material of the sealing profile strands 34, 36, 42 may be EPDM and/or TPE, which is a resilient flexible material. The reinforcing insert 57 is, preferably, made of metal.

The reinforcing insert 57 has a U-shaped cross section and surrounds a U-shaped header frame channel 60 for receiving a part of the frame of the front door 14. The header frame channel 60 faces to the inside I.

The window sealing portion 56 is arranged at one side of the first attachment portion 52 in the second direction V. On the opposite side of the first attachment portion 52 in the second direction V is arranged a body sealing portion 58. The body sealing portion 58 serves to seal the front door 14 against the body 12 in an area of the upper edge of the front door 14.

The body sealing portion 58 includes an inside body sealing lip 62 which extends essentially in the second direction, and an outside body sealing lip 64 which also extends essentially along the second direction V. A lip coating 66 (e.g. flock material) is provided at least on the outside body sealing lip 64.

The window sealing portion 56 includes an outside lip 68 which is arranged at the outside of the window sealing portion 56 and serves to engage the outside surface of the window 18.

Further, the window sealing portion 56 includes an end lip 70 which extends in a direction transverse to the movement direction of a window 18 and serves to seal an end face of the window 18. The end lip 70 is provided between the end face and the first attachment portion 52.

The outside lip 68 is provided at an outside portion of the first attachment portion 52. At an inside portion of the first attachment portion 52, a header lip carrier portion 56 extends essentially along the second direction V. A first inside lip 72 and a second inside lip 74 are connected to the header lip carrier portion 76 and extend from the inside to the outside. The first inside lip 72 and the second inside lip 74 are arranged to contact the inside surface of the window 18.

Each of the outside lip 68, the first inside lip 72 and the second inside lip 74 may be provided with a lip coating 66, for example a flock material.

An embracing (cosmetic) lip 78 of the second attachment portion 54 is connected to an end of the header lip carrier portion 76. The embracing lip 78 extends to the inside and serves to embrace an inner edge of the frame of the front door 14. The embracing lip 78 is provided more or less for cosmetic reasons. It serves to attach the header sealing profile strand 34 to the front door 14, however, with a lower retaining force than is provided by the first attachment portion 52.

FIG. 4 shows a header profile split line 80 which is arranged at the header lip carrier portion 76 in a position between the first inside lip 72 and the second inside lip 74 in the second direction V. The header profile split line 80 is a line along which the header sealing profile strand 34 is split in the area of the corner sealing portion 38.

As described above, a split portion corresponding to the corner sealing portion 38 is cut off at a position of the first joint J1, to which the corner sealing profile strand 42 is to be attached.

The portion of the header sealing profile strand 34, which is split off from the strand, includes the first inside lip 72 and the cosmetic lip 78 and is discarded for the length of the corner sealing portion 38.

The second inside lip 74 is not split off from the header sealing profile strand 34. As can be seen in FIG. 3, the second inside lip 74 extends up to the apex of the corner sealing portion 38.

On the other hand, as is shown in FIG. 6, what remains of the header sealing profile strand 34 in the area of the corner sealing portion 38 is a split header sealing profile strand 34s having a split header lip carrier portion 76s from which extends the second inside lip 74.

FIG. 5 shows a cross section of the B-pillar sealing profile strand 36. The B-pillar sealing profile strand 36 includes a B-pillar lip carrier portion 82 which extends essentially along the first direction L and which extends from an attachment portion 84 at an inside end thereof in the third direction T. The attachment portion 84 is provided for attaching the B-pillar sealing profile strand 36 to the B-pillar region 24 of the front door frame.

The attachment portion 84 includes an inside locking lip 88 and an outside locking lip 90 which serve to engage respective frame parts of the door 14.

Further, an outside lip 92 is provided at an outside end of the attachment portion 84 in the third direction T. The outside lip 92 essentially extends in cross-section along the first direction L and serves to engage an outside surface of the window 18.

An inside surface of the outside lip 92 may be provided with the lip coating 66 (e.g. flock material).

The B-pillar lip carrier portion 82 extends in cross-section from the attachment portion 84 in the first direction L at the inside end thereof in the third direction T.

An end lip 94 extends in cross-section essentially along the third direction T from the B-pillar lip carrier portion 82. The end lip 94 is provided for engaging an end face of the window 18.

Further, a first inside lip 96 and a second inside lip 98 extend from the B-pillar lip carrier portion 82 to the outside, wherein the first inside lip 96 is arranged far from the attachment portion 84 at the free end of the B-pillar lip carrier portion 82.

The shapes of the first inside lip 96 and of the second inside lip 98 correspond largely to the shapes (cross sections) of the first inside lip 72 and the second inside lip 74 of the header sealing profile strand 34, respectively.

Further, the B-pillar sealing profile strand 36 includes an embracing lip 100 which is arranged at the inside of the B-pillar lip carrier portion 82, at the free end thereof.

The embracing lip 100 serves to embrace a frame portion of the front door 14, and is provided mainly for cosmetic reasons, although some attachment function may be assigned thereto.

Similar to the header profile split line 80, a B-pillar profile split line 102 is provided at the B-pillar lip carrier portion 82 in a region between the first inside lip 96 and the second inside lip 98.

The B-pillar sealing profile strand 36 is split in the area of the corner sealing portion 38 along the B-pillar profile split line 102, wherein the part of the B-pillar sealing profile strand 36 which includes the first inside lip 96 and the embracing lip 100 is discarded for the length of the corner sealing portion 38.

The second inside lip 98 extends along the full length of the B-pillar sealing profile strand 96, up to the apex of the corner sealing portion 38, where the split header sealing profile strand 34 has a split B-pillar sealing profile strand 36s (cf. FIG. 3). The strands 34, 36 can meet so as to overlap one another, as shown in FIG. 3. On the other hand, the strand ends may also be mitre-cut, so as to form a mitre joint.

As is shown in FIG. 6, the corner sealing profile strand 42 includes a single inside lip 112, which is attached to a corner lip carrier portion 114. While the single inside lip 112 extends from the corner lip carrier portion 114 to the outside O, an embracing (cosmetic) lip 116 extends from the corner lip carrier portion 114 to the inside I, in order to engage a corner frame portion of the front door 14.

FIG. 6 also shows the split header sealing profile strand 34s from which the portion having the first inside lip 72 has been cut off. The molded portion 46 is joined to the cut off interface, along the header profile split line 80. At the outside O of the corner sealing portion 38, the outer split line 50 is visible.

On the other hand, the corner sealing profile strand 42 has a joining face 118 at which it is joined to the molded portion 46.

The position of the joint between the molded portion 46 and the corner sealing profile strand 42 is arranged such that the inner split line 48 is visible from the outside O. In other words, the inner split line 48 is visible as running essentially parallel to a tip edge of the inside lip 112. As can be seen in FIG. 6, the inner split line 48 is preferably even visible from the outside O, if the single inside lip 112 is deflected by the window 18, as shown in a dotted line in FIG. 6.

Particularly, if viewed in a direction perpendicular to the molded portion 46 and/or to a plane defined by the window 18, there is still a distance D between the tip edge of the inside lip 112 and the joining face 118 (corresponding to the inner split line 48), even if the inside lip 112 is deflected. The distance D is shown in FIG. 6.

In brief, the sealing arrangement 26 is formed by extruding the header sealing profile strand 34 in a first extrusion tool, by extruding the B-pillar sealing profile strand 36 in a second extrusion tool, and by extruding the corner sealing profile strand 42 in a third extrusion tool.

In a second step, the corner parts of the header sealing profile strand 34 and the B-pillar sealing profile strand 36 are prepared, wherein respective inner portions of the profile strands 34, 36 in the corner sealing portion 38 are cut off along the respective split lines 80 and 102, respectively, and discarded.

In a third step, the three different sealing profile strands 34, 36, 42 are inserted into a mold which is schematically shown at 120 in FIG. 6.

In the mold, material is injected and joined to the respective profile strands 34, 36, 42, so as to form a molded portion 46, as shown in FIGS. 3 and 6.

Finally, the sealing arrangement is ready to be attached to a frame portion of the front door 14, so as to establish the front door window sealing arrangement 26 described above. The sealing arrangement may be used for a rear door window, a hatchback window, etc. Further, the sealing arrangement might not only be used in the B-pillar region 24, but also in the A-pillar region 22 or in the area of the C-pillar region 25.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE NUMERALS 10 automobile/vehicle
12 body
14 front door
16 rear door
18 front door window
20 rear door window
22 A-pillar region
24 B-pillar region
25 C-pillar region
26 front door window sealing arrangement
28 rear door window sealing arrangement
30 applique arrangement
34 header sealing profile strand
34s split header sealing profile strand
36 B-pillar sealing profile strand
36s split B-pillar sealing profile strand
38 corner sealing portion
40 applique space
42 corner sealing profile strand
43a first end
43b second end
44 joint support
46 molded portion
48 inner split line 44/46
50 outer split line 34/46 and 36/46
52 first attachment portion (34)

54 second attachment portion (34)
56 window sealing portion (34)
57 reinforcing insert
58 body sealing portion
60 header frame channel
62 inside body sealing lip
64 outside body sealing lip
66 lip coating (e.g. flock)
68 outside lip
70 end lip
72 first inside lip
74 second inside lip
76 header lip carrier portion
76s split header lip carrier portion
78 embracing (cosmetic) lip
80 header profile split line
82 B-pillar lip carrier portion
84 attachment portion
88 inside locking lip
90 outside locking lip
92 outside lip
94 end lip
96 first inside lip
98 second inside lip
100 embracing lip
102 B-pillar profile split line
112 single inside lip
114 corner lip carrier portion
116 embracing (cosmetic) lip
118 joining face
120 mold
L longitudinal (first) direction
V vertical (second) direction
T transversal (third) direction
I inside
O outside
J1 first joint (zero gap) 34/42
J2 second joint (zero gap) 36/42
D distance 118/112

The invention claimed is:

1. A sealing arrangement for sealing a closure member against a frame portion, comprising:
a first extruded sealing profile strand arranged along a first direction and having a first cross-section;
a second extruded sealing profile strand arranged along a second direction transverse to the first direction and having a second cross-section; and
a corner sealing portion comprising a molded portion and joining the first extruded sealing profile strand and the second extruded sealing profile strand in a region of respective ends thereof;
wherein the corner sealing portion comprises a third extruded sealing profile strand having a third cross section and a first end and a second end, the third cross section is uniform along an entire length of the third extruded sealing profile strand, which is a separate part from the molded portion,
the molded portion is molded to the first extruded sealing profile strand, to the second extruded sealing profile strand and to the third extruded sealing profile strand, and
the first end of the third extruded sealing profile strand is joined to the first extruded sealing profile strand, and the second end of the third sealing profile strand is joined to the second extruded sealing profile strand.

2. The sealing arrangement of claim 1, wherein each of the first and the second extruded sealing profile strands comprises a first inside lip and a second inside lip for engaging the closure member.

3. The sealing arrangement of claim 1, wherein the third extruded sealing profile strand comprises a single inside lip for engaging the closure member.

4. The sealing arrangement of claim 1, wherein each of the first and the second extruded sealing profile strands comprises a first inside lip and a second inside lip for engaging the closure member, the third extruded sealing profile strand comprises a single inside lip for engaging the closure member, and the first end of the third extruded sealing profile strand is joined to the first sealing profile strand in such a manner that the first inside lip of the first extruded sealing profile strand is contiguous to the single lip at the first end of the third sealing profile strand.

5. The sealing arrangement of claim 1, wherein each of the first and the second extruded sealing profile strands comprises a first inside lip and a second inside lip for engaging the closure member, the third extruded sealing profile strand comprises a single inside lip for engaging the closure member, and the second end of the third extruded sealing profile strand is joined to the second sealing profile strand in such a manner that the first inside lip of the second extruded sealing profile strand is contiguous to the single lip at the second end of the third extruded sealing profile strand.

6. The sealing arrangement of claim 1, wherein each of the first and the second extruded sealing profile strands comprises an end lip against which may abut an end face of the closure member.

7. The sealing arrangement of claim 1, wherein each of the first and the second extruded sealing profile strands comprises an outside lip for engaging the closure member.

8. The sealing arrangement of claim 1, wherein an inner split line, which is formed by a joint between the third extruded sealing profile strand and a molded portion of the corner sealing portion, is visible as running essentially parallel to a tip edge of an inside lip of the corner sealing portion when viewed in a direction perpendicular to the molded portion.

9. The sealing arrangement of claim 1, wherein an outer split line, which is formed by a joint between a molded portion of the corner sealing portion and at least one of the first extruded sealing profile strand and the second extruded sealing profile strand, is visible as running essentially parallel to an outside edge of the molded portion when viewed in a direction perpendicular to the molded portion.

10. The sealing arrangement of claim 1, wherein the first extruded sealing profile strand comprises a first attachment portion with a reinforcing insert which defines a U-shaped frame channel.

11. The sealing arrangement of claim 1, wherein the material of at least one of the first extruded sealing profile strand, the second extruded sealing profile strand and the third extruded sealing profile strand comprises at least one of EPDM and TPE.

12. The sealing arrangement of claim 1, wherein the material of a molded portion of the corner sealing portion comprises at least one of EPDM and TPE.

13. A method for producing a sealing arrangement, comprising the steps of:
extruding a first sealing profile strand, a second sealing profile strand, and a third sealing profile strand;
placing the first extruded sealing profile strand, the second extruded sealing profile strand, and the third extruded sealing profile strand in a mold; and
joining the first extruded sealing profile strand, the second extruded sealing profile strand, and the third extruded sealing profile strand by molded material so as to form a corner sealing portion having a molded portion to which the first extruded sealing profile strand, the second extruded sealing profile strand, and the third extruded sealing profile strand are molded.

14. The method of claim 13, wherein a first end of the third extruded sealing profile strand is joined to the first extruded sealing profile strand, and wherein a second end of the third sealing profile strand is joined to the second extruded sealing profile strand.

15. The method of claim 13, wherein inner portions of the first extruded sealing profile strand and the second extruded sealing profile strand are cut off and discarded after the extruding step and before the joining step, so that first and second ends of a single lip of the third extruded sealing profile strand are placed so as to be contiguous to a first inside lip of the first extruded sealing profile strand and a first inside lip of the second extruded sealing profile strand, respectively.

16. A sealing arrangement for sealing a closure member against a frame portion, comprising:
   a first sealing profile strand arranged along a first direction and having a first cross-section;
   a second sealing profile strand arranged along a second direction transverse to the first direction and having a second cross-section; and
   a corner sealing portion joining the first sealing profile strand and the second sealing profile strand in a region of respective ends thereof;
   wherein the corner sealing portion comprises a molded portion and a third sealing profile strand, the third sealing profile strand having a third cross section, a first end, a second end, and an inside lip,
   the third cross section is uniform along an entire length of the third sealing profile strand, which is a separate part from the molded portion,
   the first end of the third sealing profile strand is joined to the first sealing profile strand, and the second end of the third sealing profile strand is joined to the second sealing profile strand, and
   an inner split line, which is formed by a joint between the third sealing profile strand and the molded portion of the corner sealing portion, is visible as running essentially parallel to a tip edge of the inside lip of the corner sealing portion when viewed in a direction perpendicular to the molded portion.

17. The sealing arrangement of claim 16, wherein an outer split line, which is formed by a joint between the molded portion of the corner sealing portion and at least one of the first sealing profile strand and the second sealing profile strand, is visible as running essentially parallel to an outside edge of the molded portion when viewed in a direction perpendicular to the molded portion.

18. The sealing arrangement of claim 16, wherein each of the first sealing profile strand, the second sealing profile strand, and the third sealing profile strand is an extruded strand.

19. The sealing arrangement of claim 18, wherein the molded portion is molded to each of the first sealing profile strand, the second sealing profile strand, and the third sealing profile strand.

* * * * *